(12) United States Patent
Tijerino

(10) Patent No.: US 7,035,625 B2
(45) Date of Patent: Apr. 25, 2006

(54) ADAPTIVE COMMUNICATION DATA RETRIEVAL SYSTEM

(75) Inventor: Yuri Adrian Tijerino, San Diego, CA (US)

(73) Assignee: Leap Wireless International, Inc., San Diego, CA (US)

( * ) Notice: Subject to any disclaimer, the term of this patent is extended or adjusted under 35 U.S.C. 154(b) by 572 days.

(21) Appl. No.: 09/995,250

(22) Filed: Nov. 27, 2001

(65) Prior Publication Data

US 2002/0077120 A1    Jun. 20, 2002

Related U.S. Application Data

(63) Continuation of application No. 09/494,188, filed on Jan. 28, 2000.

(51) Int. Cl.
*H04Q 7/20* (2006.01)
(52) U.S. Cl. .............................. 455/414.1; 455/414.2; 455/456.3
(58) Field of Classification Search ............ 455/414.1, 455/414.2, 414.3, 456.1, 456.2, 456.3, 456.4, 455/456.5, 456.6, 517, 425
See application file for complete search history.

(56) References Cited

U.S. PATENT DOCUMENTS

| 5,678,182 | A  | * | 10/1997 | Miller et al. ................ 455/12.1 |
| 5,857,155 | A  | * | 1/1999  | Hill et al. ................. 455/456.3 |
| 5,959,577 | A  | * | 9/1999  | Fan et al. .............. 342/357.13 |
| 5,987,454 | A  | * | 11/1999 | Hobbs ........................... 707/4 |
| 6,233,448 | B1 | * | 5/2001  | Alperovich et al. ......... 455/417 |
| 6,389,288 | B1 | * | 5/2002  | Kuwahara et al. ........ 455/456.6 |
| 6,539,230 | B1 | * | 3/2003  | Yen .......................... 455/456.1 |
| 6,701,144 | B1 | * | 3/2004  | Kirbas et al. ................ 455/417 |
| 6,721,542 | B1 | * | 4/2004  | Anttila et al. ................. 455/68 |
| 6,748,195 | B1 | * | 6/2004  | Phillips ..................... 455/41.2 |

* cited by examiner

*Primary Examiner*—Sonny Trinh
(74) *Attorney, Agent, or Firm*—Reed Smith LLP

(57) ABSTRACT

A system for providing a mobile communication device with information, the system including at least one server being communicable with the mobile communication device to communicate service choices and the information to the mobile communication device. Upon selection of at least one of the service choices, the mobile communication device augments the selection with data at least partially indicative of preference data and wherein the at least one server utilizes the augmented selection to identify information corresponding to the augmented selection. The server then communicates the identified information to the mobile communications device.

76 Claims, 2 Drawing Sheets

ADAPTIVE COMMUNICATION DATA RETRIEVAL SYSTEM

CROSS REFERENCE TO RELATED APPLICATIONS

This application is a continuation of U.S. patent application Ser. No. 09/494,188 entitled "Adaptive Communication Data Retrieval System" filed Jan. 28, 2000, the entire disclosure of which is hereby incorporated by reference herein.

BACKGROUND OF THE INVENTION

1. Field of the Invention

The invention relates to an adaptive communication data retrieval system for sending and receiving personalized information from a communication device via a communication network to a server based retrieval system.

2. Description of the Background

The business world and our personal lives have become highly dependent on the communications industry. Technological advances have created the ability for individuals to access vast amounts of information from anywhere in the world using communication devices such as a desktop computer, a portable computer, a mobile phone, or a pager. The communication devices operate on communication networks such as the Internet, wireless based, and non-wireless based systems.

This technology is changing the way individuals communicate with one another. Business and personal communications have evolved into information dependent worlds. From the business environment to the home, the ability to access information in a quick, efficient, and cost effective manner is desired. Many existing systems allow a business or personal user to access information based on non-personalized, generic searches. The result of these searches is often a list of information sources that are useless or non-related to the search causing significant delays in finding the desired information. This means that the flow of information is slowed down considerably and the user becomes less efficient.

More recently, communication devices have taken personalization into account in only an introductory manner by allowing the user to program certain preferences for the communication device to retrieve. The communication device will only retrieve the programmed preferences with no further personalization, for example, a pager that retrieves stock market information or a mobile phone that retrieves e-mail.

The problem with these systems is that they are limited in only being able to retrieve programmed preferences. It would be beneficial to have a communication device that would adapt to the user's personal preferences. The communication device could use learning usage patterns or historical data patterns to allow the user to have specific personalized information retrieval. The personalized information could also include environmental data such as the position of the user, the date, the time, the weather, or other parameters that would further allow a personalized search.

For the reasons described above, there remains a need for an adaptive communication data retrieval system that allows the user to retrieve personalized data in a quick, efficient, and easy to use manner.

SUMMARY OF THE INVENTION

A system for providing a mobile communication device with information, the system including at least one server being communicable with the mobile communication device to communicate service choices and the information to the mobile communication device wherein, upon selection of at least one of the service choices, the mobile communication device augments the selection with data at least partially indicative of preference data and wherein the at least one server utilizes the augmented selection to identify information corresponding to the augmented selection and communicate the identified information to the mobile communications device.

BRIEF DESCRIPTION OF THE DRAWINGS

Understanding of the present invention will be facilitated by consideration of the following detailed description of a preferred embodiment of the present invention taken in conjunction with the accompanying drawings, in which like numerals refer to like parts and in which.

DETAILED DESCRIPTION OF THE INVENTION

Figure 1:
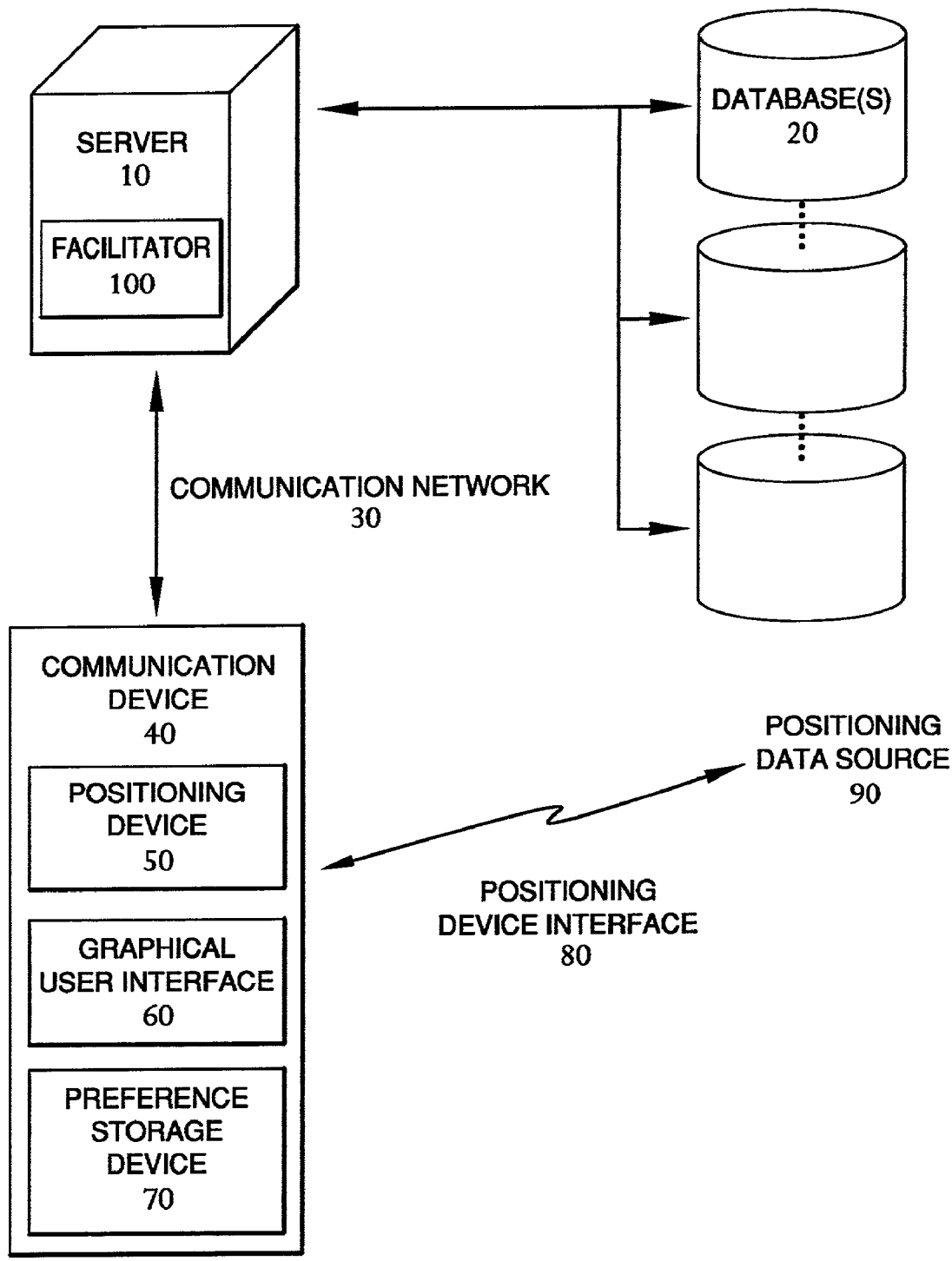
FIG. 1 is a block diagram of the adaptive communication data processing system.

It is to be understood that the figures and descriptions of the present invention have been simplified to illustrate elements that are relevant for a clear understanding of the present invention, while eliminating, for purposes of clarity, many other elements found in a deal structuring system and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

The disclosure hereinbelow is directed to all such variations and modifications to deal structure know to those skilled in the art.

This application is a continuation of U.S. patent application Ser. No. 09/494,188 entitled "Adaptive Communication Data Retrieval System" filed Jan. 28, 2000, the entire disclosure of which is hereby incorporated by reference herein as if set forth in its entirety.

It is an aspect of the present invention to provide an adaptive communication data retrieval system that provides for highly personalized data retrieval.

It is a further aspect of the present invention to provide an adaptive communication data retrieval system that provides for an adaptive capability to learn and become more efficient at finding focused personalized information through learned usage patterns and/or historical data.

It is yet another aspect of the present invention to provide an adaptive communication data retrieval system that allows the user to retrieve personalized data in a quick, efficient, and easy to use manner.

In one embodiment, the adaptive communication data retrieval system comprises a communication network to facilitate data transmission, a communication device for sending and receiving data via the communication network including a preference storage device for storing preference data and a graphical user interface.

The system also includes a server that interfaces and receives augmented data from the communication device via the communication network. The server maintains a data listing of communication service choices or information service options that are available to the communication device through the graphical user interface. As used herein, the terms communication service choices and information service options are interchangeable. A plurality of databases interface the server. The server retrieves data from the databases responsive to the augmented data where the augmented data includes a selectable communication service choice and preference data. The server sends the retrieved data to the communication device via the communication network. The implementation of the invention is not dependent on any particular device and can be implemented in various configurations and architectures.

In another embodiment, the invention is a method for processing Communication service choices from a user of a communication device. The communication device establishes a connection to a server over the communication network. Communication service choices are displayed to the user on the communication device via the communication network. The user selects a communication service choice and the choice is augmented with preference data. The users augmented data is sent to the server via the communication network. The server retrieves data responsive to the augmented data. The server then sends the retrieved data to the communication device via the communication network and the communication device displays and stores selected portions of the retrieved data. The communication device preferentially saves selected portions of the retrieved data to update and refine the preference storage device. The implementation of the invention is not dependent on any particular device and can be implemented in various configurations and architectures.

As illustrated in FIG. 1, the adaptive communication data retrieval system comprises a communication network 30, a communication device 40, a server 10, and a plurality of databases 20. The adaptive communication data retrieval system provides for sending and receiving personalized information from a communication device 40 via a communication network 30 to a server 10 based retrieval system. The adaptive communication data retrieval system is unique because the system has an adaptive capability in that it learns and becomes more efficient at finding focused personalized information through learned usage patterns and/or historical data. The implementation of the invention is not dependent on any particular device and can be implemented in various configurations and architectures.

The communication network 30 can be any network that allows the sending and receiving of data. One example embodiment would be a wireless based system such as cellular, GSM (Global System for Mobile communications), PCS (Personal Communications Services), PDC (Personal Digital Cellular), or radio communications network. Another example embodiment would be a non-wireless based system such as a modem, ISDN (integrated Services Digital Network), Internet DSL (Digital Subscriber Line), Internet Cable, or direct network based Internet connections. Selection and incorporation of such a communication network will be apparent to those of skill in the art.

The communication device 40 can be any device that allows for user input to be sent and received over a communication network 30. In an example embodiment, the communication device 40 can be a mobile phone, handheld computer, laptop, desktop computer, or a pager. The communication device 40 can include a transceiver or any other device that will allow for sending and receiving data via the communication network 30. The implementation of the invention is not dependent on any particular device and can be implemented in various configurations and architectures.

The communication device 40 is a smart device in that the communication device 40 stores preference data in the preference storage device 70 and augments a user's communication service choice with the preference data to perform highly personalized data retrieval. Communication service choices (information service options) are stored on the server 10 and received by the communication device 40 by establishing a connection from the communication device 40 to the server 10. The server 10 sends a list of communication service choices that are displayed on the communication device 40. The communication service choices can include major service choices that the user will initially see displayed on the communication device 40. The major service choices can include traffic directions, traffic monitoring, points of interest, reservation systems, and any other user desired choices. The major service choices will typically have sub-menus that allow the user to select a more detailed choice under the major service. For example, a user selects the points of interest as the major service and the communication device 40 will display the submenu of the points of interests. The submenu will display more narrowed choices associated with the major service, for example, atm locations, banks, gas stations, restaurants, grocery stores, parks, museums, hotels, department stores, entertainment, vacation spots, and any other user related data.

A user can choose a communication service choice through the graphical user interface 60. The graphical user interface 60 can be any graphical based program that allows input interaction such as a propriety software program or an Internet web browser. The actual selection of the communication service choices can be done through manual entry, voice communication, and/or thought process mechanisms. Manual entry can be accomplished by the user entering the information through a touch screen, keyboard, keypad, and shortcut buttons. Voice communication can be accomplished through the use of a voice recognition system incorporated into the commination device 40, whereby the user speaks into a microphone and the communication device 40 translates the voice data so that the communication device 40 will automatically select the user's selection on the graphical user interface 60. Thought process mechanisms could be incorporated into the communication device 40 to allow hands free entry. Neural attachments could be secured to the user's head so that brain waves could be translated by the communication device 40 so that the communication device 40 will automatically select the user's selection on the graphical user interface.

The communication device 40 includes a preference storage device 70 that stores preference data. The preference storage device 70 can independently eliminate and/or add to the stored preference data. The preference data comprises of user preferences and environmental data. The preference storage device 70 can collect and monitor user preferences from different sources including, but not limited too, a user profile, pre-stored data, pre-acquired data, learned data, historical data, or any other manner that would allow for collection and monitoring of user preferences. The user preferences can include the user's favored choices, redundant choices that the user has used on a recurrent basis, or any other criteria for determining user preferences. For example, the user preferences may include favorite restaurants, preferred cuisines, grocery stores, department stores, gas stations, entertainment, hotels, and vacation spots.

The environmental data can include data based on the position of the user, time, temperature, weather, scheduling data, or any other external information. The environmental data can be collected from environmental devices integrated into the communication device or received from externally located environmental devices. For example, the communication device 40 can include a positioning device 50, a thermometer, a barometer, a clock, and a scheduling program. Alternatively, these environmental devices can be in a remote location, whereby the communication device 40 will receive the environmental data from the external environmental device for the preference storage device 70 to use. The preference data is combined with user's communication service choice resulting in augmented data that is sent to the server 10 for data retrieval.

In one implementation, the communication device 40 can include a positioning device 50 that will independently determine the position of the communication device 40. The positioning device 50 can use any available technology that will enable position determination, for example, GPS (Global Positioning System) or triangulation. A triangulation system determines the position of the communication device 40 by triangulating a signal from the communication device 40 with the fixed locations of two or more base stations.

In the alternative, the communication device 40 can receive the position from a positioning data source 90 via a positioning device interface 80. The positioning device interface 80 allows for the communication device 40 to send and receive positioning information to the positioning data source 90. The positioning data source 90 can use any available technology that will enable position determination such as GPS or triangulation as discussed above. Additionally, the user can supply position information through the communication device 40. The positioning data from any of the above methods ran be used for the environmental data incorporated into the preference data. Selection and incorporation of such positioning methods will be apparent to those of skill in the art.

The server 10 has the main function of retrieving data responsive to the augmented data received from the communication device 40 via the communication network 30. The location of the server 10 can be a local based server or a remote server. The server 10 includes hardware and software based systems. The hardware system can be any computer based server system that preferably includes a monitor, a keyboard, a central processing unit, memory, storage devices, and the capability to interface a communication network 30. Selection and incorporation of such server based hardware will be apparent to those of skill in the art.

The software based system includes an operating system, communication network interface software, and a facilitator 100. The operating system can be any operating system that allows connection to a communication network 30 and provides the ability to run related software. The communication network interface software can be any software that allows for conversion and transmission of data sent to and by the server 10 via a communication network 30. Selection and incorporation of such an operating system and interfacing software will be apparent to those of skill in the art.

The facilitator 100 is a software program or system that resides on the server 10. The facilitator 100 is used to receive augmented data from the communication device 40 via the communication network 30 and to parse the augmented data into retrievable categories. The facilitator 100 uses the retrievable categories to direct sub-component programs to search the databases 20. The sub-component programs return the results of the search data to the facilitator 100. The server 10 can then send the retrieved information to the communication device 40 via the communication network 30. Alternatively, the facilitator 100 can have the ability to take the retrieved search data from the sub-components and add historical suggestion data. The historical suggestion data can reside on the server 10 or in an external database. The historical suggestion data will preferably be a listing of the most widely accessed choices from a plurality of users. This means that the user will receive the data they requested and also receive historical suggestion data. In one implementation, the communication device 40 will display the search results of the user's augmented data and a separate list of suggestions based on other users most accessed choices.

The plurality of databases 20 house an abundant amount of data for the server 10 to retrieve data responsive to the user's augmented data. The databases 20 can be housed on the server and/or remote servers. The server 10 has the ability to access databases 20 stored on remote servers. Selection and incorporation of such databases will be apparent to those of skill in the art.

In a preferred embodiment of the present invention as shown in FIG. 1, the adaptive communication data retrieval system is a wireless location-based information retrieval system. The communication device 40 is a wireless device that includes a transceiver for sending and receiving communications across a wireless communication network 30. The positioning data source 90 determines a location of the wireless device 40, and provides location data indicative of the location of the wireless device 40. The wireless device 40 further includes an Internet browser accessible through the graphical user interface 60. A remote server 10 includes a transceiver for receiving communications, including the location data, from the wireless device 40. In this embodiment, the remote server 10 also maintains a web page that lists information service options that are accessible to and selectable by the wireless device 40 via the Internet browser. The remote server 10 retrieves information from the databases 20 based upon the location data, a selected service option, and preference data provided by the wireless device. The retrieved information is sent to the wireless device 40 via the wireless communication network 30.

Figure 2:
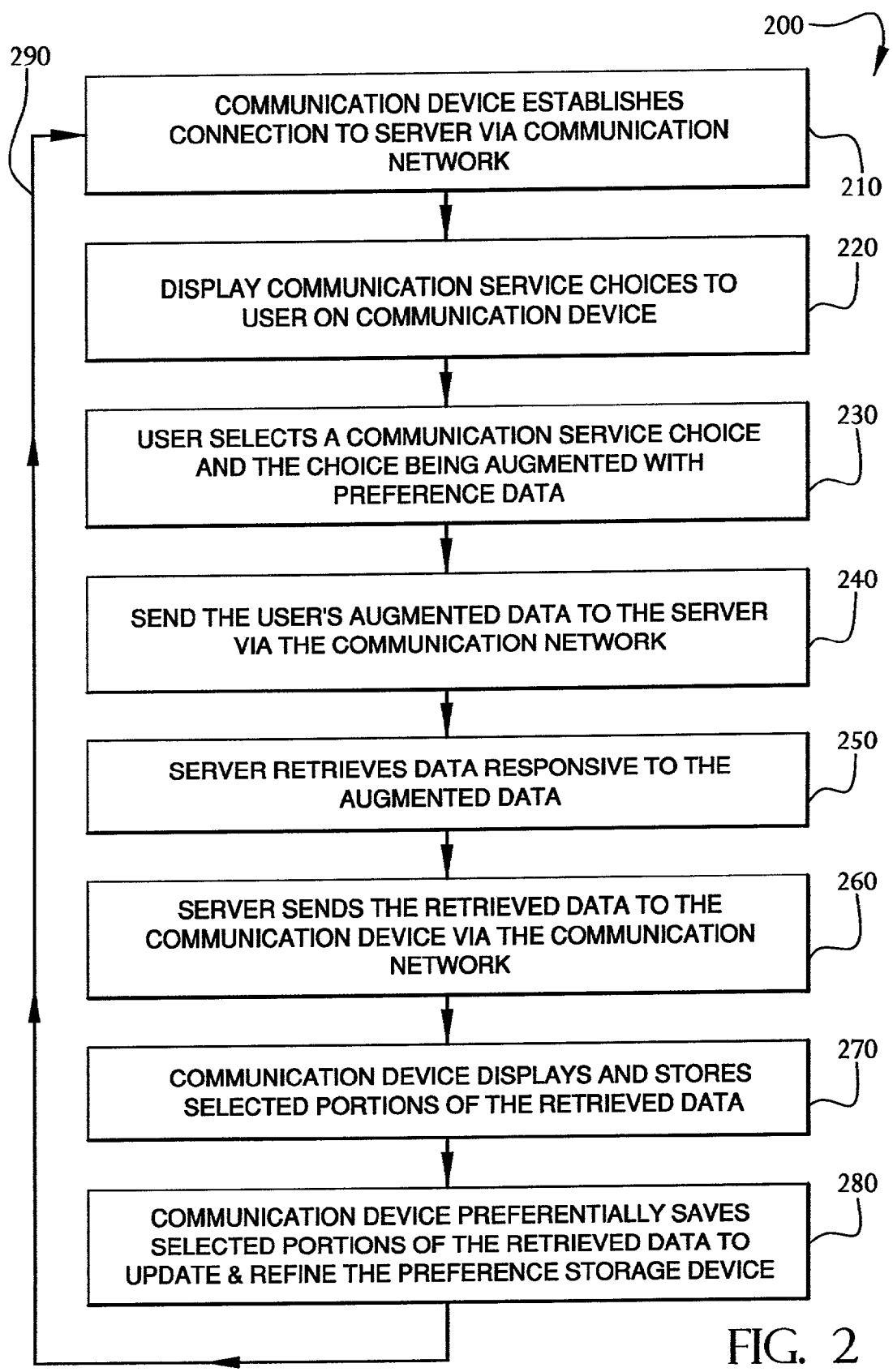
FIG. 2 is a flowchart illustrating a method for requesting information across a communication network of the adaptive communication data retrieval system.

In one implementation as shown in FIGS. 1 and 2, a method 200 for an adaptive communication data retrieval system provides for sending and receiving personalized information from a immunization device 40 via a communication network 30 to a server 10 based retrieval system. The communication device 40 sends and receives data via the communication network 30. The server 10 receives augmented data sent from the communication device 40.

Referring to FIG. 2, in step 210 the communication device 40 establishes a connection to the server 10 via the communication network 30. The server 10 maintains a data listing of communication service choices that are available to the communication device 40 through a graphical user interface 60. In step 220, the server 10 sends the communication service choices via the communication network 30 to the communication device 40 for display to the user.

The user selects a communication service choice that is augmented with preference data from the preference storage device 70 as in step 230. As discussed above, the user can choose a communication service choice through the graphical user interface 60. The graphical user interface 60 can be any graphical based program that allows input interaction such as a propriety software program or an Internet web browser. The actual selection of the communication service choices can be done through manual entry, voice communication, and/or thought process mechanisms as discussed above. Once the user selects a communication service choice, the preference storage device 70 provides preference data that is combined with user's communication service choice resulting in augmented data. As discussed above, the preference data comprises user preferences and environmental data.

In step 240, the communication device 40 sends the augmented data to the server 10 via the communication network 30. The server 10 retrieves data responsive to the augmented data by use of the facilitator 100 in step 250. When the server 10 receives the augmented data, the facilitator 100 parses the augmented data into retrievable categories. The facilitator 100 uses the retrievable categories to direct sub-component programs to search the databases 20. The sub-component programs return the results of the search data to the facilitator 100. The facilitator 100 can have the ability to take the retrieved search data from the sub-components and add historical suggestion data. The historical suggestion data can reside on the server 10 or in an external database. The historical suggestion data will preferably be a listing of the most widely accessed choices from a plurality of users. This means that the user will receive the data they requested and also receive historical suggestion data.

The server 10 sends the retrieved data to the communication device 40 via the communication network 30 in step 260. The communication device 40 displays and stores selected portions of the retrieved data in step 270. In one implementation, the communication device 40 will display the search results of the user's augmented data and a separate list of suggestions based on other users most accessed choices. The communication device 40 stores selected portions of the retrieved data for the user to access on a temporal basis.

In step 280, the communication device 40 preferentially saves selected portions of the retrieved data to update and refine the preference storage device 70. The preference storage device 70 can independently eliminate and/or add to the saved preference data. The process repeats again at step 210 as shown in step 290. The implementation of the invention is not dependent on any particular device and can be implemented in various configurations and architectures.

The adaptive communication data retrieval system of the present invention provides many advantages over devices currently available for use. It allows for highly personalized data retrieval in a quick, efficient, and easy to use manner. It has an adaptive capability to learn and become more efficient at finding focused personalized information through learned usage patterns and/or historical data.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A system for providing a mobile communication device with information, said system comprising:
   at least one server being communicable with said mobile communication device to communicate service choices and said information to said mobile communication device;
      wherein, upon selection of at least one of said service choices, said mobile communication device augments said selection with data at least partially indicative of preference data; and
      wherein the at least one server utilizes said augmented selection to identify information corresponding to said augmented selection and communicate the identified information to the mobile communications device.

2. The system of claim 1, wherein the preference data includes one or more of the group consisting of a user profile, pre-stored data, pre-acquired data, learned data, and historical data.

3. The system of claim 1, wherein the server includes a facilitator to parse said augmented data to effect the retrieval of said identified information from the at least one server.

4. The system of claim 1, wherein the mobile communication device includes a preference storage device wherein preference data is stored and said preference storage device may add or delete preference data.

5. The system of claim 1, wherein the mobile communications device includes a graphical user interface.

6. The system of claim 1, wherein the at least one server utilizes said augmented selection to identify information corresponding to said augmented selection and further modifies the identified information with historical suggestion data prior to communicating the identified information and the historical suggestion data to the mobile communications device.

7. A system for providing a mobile communication device with information, said system comprising:
   at least one server being communicable with said mobile communication device to communicate service choices and said information to said mobile communication device;
      wherein, upon selection of at least one of said service choices, said mobile communication device augments said selection with data at least partially indicative of environmental data; and
      wherein the at least one server utilizes said augmented selection to identify information corresponding to said augmented selection and communicate the identified information to the mobile communications device.

8. The system of claim 7, wherein the environmental data includes data selected from one or more of the group consisting of a current position of the mobile communication device, a current time, a current temperature, a current weather condition, and user scheduling information.

9. The system of claim 8, wherein the current position of the mobile communications device is determined internally to the mobile communications device.

10. The system of claim 8, wherein the current position of the mobile communications device is acquired via an interface to an external position data source.

11. The system of claim 7, wherein the server includes a facilitator to parse said augmented data to effect the retrieval of said identified information from the at least one server.

12. The system of claim 7, wherein the at least one server is communicable with said mobile communication device via a network transceiver thereby providing a connection to a communications network.

13. The system of claim 7, wherein the mobile communication device includes one or more of components selected from the group consisting of a positioning device, a thermometer, a barometer, and a clock.

14. The system of claim 7, wherein the mobile communications device includes a graphical user interface.

15. The system of claim 7, wherein the server utilizes said augmented selection to identify information corresponding to said augmented selection and further modifies the identified information with historical suggestion data prior to communicating the identified information and the historical suggestion data to the mobile communications device.

16. A server being operable within a networked communication system and for providing identified information to at least one mobile communications device, said server comprising:
- at least one network connection to transmit service choices to at least one mobile communication device and receive one or more service choice selections augmented with preference data; and
- a facilitator to receive said one or more augmented selections and identify information corresponding to said one or more augmented selections and communicate the identified information to the mobile communications device.

17. The server of claim 16, wherein the preference data includes one or more of the group consisting of a user profile, pre-stored data, pre-acquired data, learned data, and historical data.

18. The server of claim 16, wherein the server includes a facilitator to parse said augmented selection to identify information corresponding to said one or more augmented selections.

19. The server of claim 16 wherein the a least one network connection comprises a network transceiver.

20. The server of claim 16, wherein the mobile communication device includes a preference storage device wherein preference data is stored and said preference storage device may add or delete preference data.

21. The server of claim 16, wherein the mobile communications device includes a graphical user interface.

22. The server of claim 16, wherein the server utilizes said augmented selection to identify information corresponding to said augmented selection and further modifies the identified information with historical suggestion data prior to communicating the identified information and the historical suggestion data to the mobile communications device.

23. A server being operable within a networked communication system and for providing identified information to at least one mobile communications device, said server comprising:
- at least one network connection to transmit service choices to at least one mobile communication device and receive one or more service choice selections augmented with environmental data; and
- a facilitator to receive said one or more augmented selections and identify information corresponding to said or more augmented selections and communicate the identified information to the mobile communications device.

24. The server of claim 23, wherein the environmental data includes data selected from one or more of the group consisting of a current position of the mobile communication device, a current time, a current temperature, a current weather condition, and user scheduling information.

25. The server of claim 23, wherein the mobile communication device includes one or more of components selected from the group consisting of a positioning device, a thermometer, a barometer, and a clock.

26. A mobile communication device comprising:
- a user interface being suitable to select one or more service choices provided by a server; and
- a positioning device being suitable to provide position data;
- wherein, when said mobile device receives service choices from said server, and at least one of said service choices is selected using said user interface, said mobile communication device augments said selection with preference indicative data and transmits said augmented selection to said server.

27. The mobile communication device of claim 26, wherein the preference data includes one or more of the group consisting of a user profile, pre-stored data, pre-acquired data, learned data, and historical data.

28. The mobile communication device of claim 26, further comprising a preference storage device wherein said preference storage device may add or delete preference data.

29. The mobile communication device of claim 26, wherein the user interface is a graphical user interface whereby a user may select said services choices provided by said server.

30. The mobile communication device of claim 26, wherein said server utilizes said augmented selection to identify information corresponding to said augmented selection and further modifies the identified information with historical suggestion data prior to communicating the identified information and the historical suggestion data to the mobile communications device.

31. The mobile communication device of claim 26, wherein said server includes a facilitator to parse said augmented selection to identify information corresponding to said augmented selection.

32. A mobile communication device comprising:
- a user interface being suitable to select one or more service choices provided by a server; and
- a positioning device being suitable to provide position data;
- wherein, when said mobile device receives service choices from said server, and at least one of said service choices is selected using said user interface, said mobile communication device augments said selection with environmental indicative data and transmits said augmented selection to said server.

33. The mobile communication device of claim 32, wherein the environmental data includes data selected from one or more of the group consisting of a current position of the mobile communication device, a current time, a current temperature, a current weather condition, and user scheduling information.

34. The mobile communication device of claim 33, wherein current position of mobile communications device is determined internally to the mobile communications device.

35. The mobile communication device of claim 33, wherein the current position of said mobile communications device is acquired via an interface to an external position data source.

36. The mobile communication device of claim 32, wherein said the server includes a facilitator to parse said augmented selection to identify information corresponding to said augmented selection.

37. The mobile communication device of claim 32, wherein said the mobile communication device includes one or more of components selected from the group consisting of a positioning device, a thermometer, a barometer, and a clock.

38. The mobile communication device of claim 32, wherein said user interface is a graphical user interface whereby a user may select said services choices provided by said server.

39. The mobile communication device of claim 32, wherein said server utilizes said augmented selection to identify information corresponding to said augmented selection and further modifies the identified information with historical suggestion data prior to communicating the identified information and the historical suggestion data to the mobile communications device.

40. A method for providing a mobile communication device with information, said method comprising:
  establishing a communicative connection between a server and a mobile communications device, so as to enable said server to transmit service choices to said mobile communication device;
  augmenting a selection of at least one of said service choices with preference data;
  transmitting said augmented data to said server wherein said server utilizes said augmented selection to identify information corresponding to said augmented selection; and
  communicating the identified information to the mobile communications device.

41. The method of claim 40, wherein the preference data includes one or more of the group consisting of a user profile, pre-stored data, pre-acquired data, learned data, and historical data.

42. The method of claim 40, wherein said server includes a facilitator to parse said augmented selection to identify information corresponding to said augmented selection.

43. The method of claim 40, wherein said server is communicable with said mobile communication device via a network transceiver thereby providing a connection to a communications network.

44. The system of claim 40, wherein said mobile communication device includes a preference storage device wherein preference data is stored and said preference storage device may add or delete preference data.

45. The method of claim 40, wherein the mobile communications device includes a graphical user interface.

46. The method of claim 40, wherein said server utilizes said augmented selection to identify information corresponding to said augmented selection and further modifies the identified information with historical suggestion data prior to communicating the identified information and the historical suggestion data to the mobile communications device.

47. A method for providing a mobile communication device with information, said method comprising:
  establishing a communicative connection between a server and a mobile communications device, so as to enable said server to transmit service choices to said mobile communication device;
  augmenting a selection of at least one of said service choices with environmental data;
  transmitting said augmented data to said server wherein said server utilizes said augmented selection to identify information corresponding to said augmented selection; and
  communicating the identified information to the mobile communications device.

48. The method of claim 47, wherein said mobile communication device includes one or more of components selected from the group consisting of a positioning device, a thermometer, a barometer, and a clock.

49. The method of claim 47, wherein the environmental data includes data selected from one or more of the group consisting of a current position of the mobile communication device, a current time, a current temperature, a current weather condition, and user scheduling information.

50. The method of claim 49, wherein the current position of the mobile communications device is determined internally to the mobile communications device.

51. The method of claim 49, wherein the current position of the mobile communications device is acquired via an interface to an external position data source.

52. The method of claim 47, wherein said server includes a facilitator to parse said augmented selection to identify information corresponding to said augmented selection.

53. The method of claim 47, wherein the mobile communications device includes a graphical user interface.

54. The method of claim 47, wherein said server utilizes said augmented selection to identify information corresponding to said augmented selection and further modifies the identified information with historical suggestion data prior to communicating the identified information and the historical suggestion data to the mobile communications device.

55. A method of providing identified information to at least one mobile communications device from at least one server, said method comprising:
  transmitting service choices from said at least one server to said mobile communication device;
  selecting one or more service choices with said mobile communication device;
  supplementing said selection with augmented data comprising preference data;
  transmitting said augmented selection from said mobile communication device to said at least one server;
  utilizing a facilitator to identify information corresponding to said augmented selection; and
  communicating the identified information to the mobile communications device.

56. The method of claim 55, wherein the preference data includes one or more of the group consisting of a user profile, pre-stored data, pre-acquired data, learned data, and historical data.

57. The method of claim 55 wherein the server includes a facilitator to parse said augmented data to identify information corresponding to said augmented selection.

58. The method of claim 55, wherein the mobile communication device includes a preference storage device wherein preference data is stored and said preference storage device may add or delete preference data.

59. The method of claim 55, wherein the mobile communications device includes a graphical user interface.

60. The method of claim 55, wherein the server utilizes said augmented selection to identify information corresponding to said augmented selection and further modifies the identified information with historical suggestion data prior to communicating the identified information and the historical suggestion data to the mobile communications device.

61. A method of providing identified information to at least one mobile communications device from at least one server, said method comprising:
  transmitting service choices from said at least one server to said mobile communication device;
  selecting one or more service choices with said mobile communication device;
  supplementing said selection with augmented data comprising environmental data;
  transmitting said augmented selection from said mobile communication device to said at least one server;
  utilizing a facilitator to identify information corresponding to said augmented selection; and
  communicating the identified information to the mobile communications device.

62. The method of claim 61, wherein the environmental data includes data selected from one or more of the group consisting of a current position of the mobile communication device, a current time, a current temperature, a current weather condition, and user scheduling information.

63. The method of claim 61, wherein the mobile communication device includes one or more of components selected from the group consisting of a positioning device, a thermometer, a barometer, and a clock.

64. The method of claim 61 wherein the server includes a facilitator to parse said augmented data to identify information corresponding to said augmented selection.

65. The method of claim 61, wherein the mobile communications device includes a graphical user interface.

66. The method of claim 61, wherein said server utilizes said augmented selection to identify information corresponding to said augmented selection and further modifies the identified information with historical suggestion data prior to communicating the identified information and the historical suggestion data to the mobile communications device.

67. A method of obtaining information from at least one server using a mobile communications device, said method comprising:
    receiving service choices by a mobile communication device from at least one server;
    selecting one or more said service choices as selection choices with a mobile communications device,
    augmenting said selection choices within said mobile communications device with preference data and position data;
    transmitting said augmented selection choices to said at least one server and receiving information identified by said at least one server corresponding to said augmented selection choices.

68. The method of claim 67, wherein the preference data includes one or more of the group consisting of a user profile, pre-stored data, pre-acquired data, learned data, and historical data.

69. The method of claim 67, wherein the environmental data includes data selected from one or more of the group consisting of a current position of the mobile communication device, a current time, a current temperature, a current weather condition, and user scheduling information.

70. The method of claim 69, wherein the current position of mobile communications device is determined internally to the mobile communications device.

71. The method of claim 69, wherein the current position of said mobile communications device is acquired via an interface to an external position data source.

72. The method of claim 67, wherein the server includes a facilitator to parse said augmented data.

73. The method of claim 67, wherein the preference data resides in a preference storage device and said preference storage device may add or delete preference data.

74. The method of claim 67, wherein the mobile communication device includes one or more of components selected from the group consisting of a positioning device, a thermometer, a barometer, and a clock.

75. The method of claim 67, wherein the mobile communication device contains a graphical user interface whereby the a user may select the services choices provided by the at least one server.

76. The method of claim 67, wherein the at least one server utilizes said augmented selection to identify information corresponding to said augmented selection and further modifies the identified information with historical suggestion data prior to communicating the identified information and the historical suggestion data to the mobile communications device as said downloaded information.

* * * * *